US008582128B2

(12) United States Patent
Nemoto

(10) Patent No.: US 8,582,128 B2
(45) Date of Patent: Nov. 12, 2013

(54) IMAGE-FORMATION CONTROL DEVICE, IMAGE-FORMATION CONTROL METHOD, AND COMPUTER PROGRAM PRODUCT

(75) Inventor: Masakazu Nemoto, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 687 days.

(21) Appl. No.: 12/880,443

(22) Filed: Sep. 13, 2010

(65) Prior Publication Data

US 2011/0063647 A1 Mar. 17, 2011

(30) Foreign Application Priority Data

Sep. 15, 2009 (JP) ................................ 2009-213326
Jul. 26, 2010 (JP) ................................ 2010-167483

(51) Int. Cl.

*G06F 3/12* (2006.01)
*G06K 15/02* (2006.01)
*H04N 1/00* (2006.01)
*B41J 25/20* (2006.01)

(52) U.S. Cl.

USPC ........... 358/1.13; 358/1.1; 358/1.2; 358/1.12; 358/1.18; 358/501; 358/401; 399/384; 400/103

(58) Field of Classification Search

None
See application file for complete search history.

(56) References Cited

U.S. PATENT DOCUMENTS 7,099,029 B2 * 8/2006 Hopper ........................ 358/1.15
2005/0242178 A1 * 11/2005 Minowa ........................ 235/383
2008/0159800 A1 * 7/2008 Wada ............................ 400/621
2008/0316534 A1 * 12/2008 McGarry et al. ............. 358/1.18

FOREIGN PATENT DOCUMENTS

JP 1-125265 5/1989
JP 2-11372 1/1990
JP 2-55174 2/1990
JP 5-64925 3/1993
JP 10-44552 2/1998
JP 2005-41060 2/2005
JP 2010-179597 * 8/2010

* cited by examiner

*Primary Examiner* — King Poon
*Assistant Examiner* — Beniyam Menberu
(74) *Attorney, Agent, or Firm* — Oblon, Spivak, McClelland, Maier & Neustadt, L.L.P.

(57) ABSTRACT

A device includes: a receiver receiving a displacement of an image formation target area in a sub-scanning direction from a reference position on a continuous form with side portions having holes and with a page boundary per a length; a calculator calculating marker lengths of markers marking upper and lower ends of a page of the continuous form based on the displacement, a shortest distance to the holes from the page boundary, and a reference length for when the displacement is not specified for the markers; another calculator calculating start positions of the markers based on the displacement, the distance, the reference length, and a length of the target area in the sub-scanning direction; and a controller performing, with respect to an apparatus, control of the image formation of the markers in the side portions from the start positions over the marker lengths.

13 Claims, 12 Drawing Sheets

IMAGE-FORMATION CONTROL DEVICE, IMAGE-FORMATION CONTROL METHOD, AND COMPUTER PROGRAM PRODUCT

CROSS-REFERENCE TO RELATED APPLICATIONS

The present application claims priority to and incorporates by reference the entire contents of Japanese Patent Application No. 2009-213326 filed in Japan on Sep. 15, 2009 and Japanese Patent Application No. 2010-167483 filed in Japan on Jul. 26, 2010.

BACKGROUND OF THE INVENTION

1. Field of the Invention

The present invention relates to an image-formation control device, an image-formation control method, and a computer program product.

2. Description of the Related Art

Conventionally, a method for facilitating sorting of a roll of printed matter formed of a large volume of printed continuous recording paper is known, in which by printing markers across perforated lines of the continuous recording paper, breaks between jobs are identified with the printed matter being folded without the necessity of checking the contents of the printed matter.

For example, Japanese Patent Application Laid-open No. H10-44552 discloses a method of generating markers that extend across boundary of an image forming area corresponding to a size of continuous recording paper, and synthesizing and printing the generated markers and print image data together.

Japanese Patent Application Laid-open No. H1-125265 discloses a method of receiving signals indicating positions of mountain-folded perforated lines of continuous recording paper, identifying the positions of the mountain-folded perforated lines based on the signals, and printing a pattern of rectangular markers across the mountain-folded perforated lines. Japanese Patent Application Laid-open No. H2-55174 discloses a method of printing markers on tear-off sprocket-hole sections to reduce wasted paper.

However, the above-described conventional methods have the following problems. In the method disclosed in Japanese Patent Application Laid-open No. H10-44552, when the continuous recording paper is pre-printed paper, on which a company name, a logo, or an advertisement is printed beforehand (pre-printed), if, in order to fit the printed contents by a printer to the pre-printed contents on the continuous recording paper, printed image data are shifted by an operator in a main-scanning direction and a sub-scanning direction, a print position of a marker is displaced together with the printed image data, and thus the marker may not be able to be printed across a perforated line.

The method disclosed in Japanese Patent Application Laid-open No. H1-125265 has a problem of having to provide a mechanism dedicated to recognition of the positions of the perforated lines. Japanese Patent Application Laid-open No. H2-55174 discloses an example of printing markers of a single type on the tear-off sprocket-hole sections over several pages from a job start page to make the breaks between jobs identifiable, but because the markers are of the single type, if, for example, jobs each consisting of one page are printed continuously, the markers are printed continuously before and after each one-page job, and thus there is a problem of not being able to recognize the breaks between the one-page jobs.

SUMMARY OF THE INVENTION

It is an object of the present invention to at least partially solve the problems in the conventional technology.

According to an aspect of the present invention, an image-formation control device is configured to control an image forming apparatus that performs image formation on a continuous form that has side portions provided with holes and that has a page boundary per predetermined length. The image-formation control device includes: an input receiving unit configured to receive an input of a displacement of an image forming area in a sub-scanning direction from a reference position on the continuous form, the image forming area being a target of the image formation; a marker-length calculating unit configured to calculate marker lengths of an upper marker marking an upper end of a page of the continuous form and a lower marker marking a lower end of a page of the continuous form, based on the displacement, a shortest distance to the holes from the page boundary in the side portions, and a reference marker length for when the displacement is not specified with respect to each of the upper marker and the lower marker; a marker-start-position calculating unit configured to calculate image-formation start positions of the upper marker and the lower marker based on the displacement, the distance, the reference marker length, and a length of the image forming area in the sub-scanning direction; and a control unit configured to perform, with respect to the image forming apparatus, control of the image formation of the upper marker and the lower marker in the side portions from the image-formation start positions calculated over the marker lengths calculated.

According to another aspect of the present invention, an image-formation control method is executed by the image-formation control device and includes: receiving an input of a displacement of an image forming area in a sub-scanning direction from a reference position on the continuous form, the image forming area being a target of the image formation; calculating marker lengths of an upper marker marking an upper end of a page of the continuous form and a lower marker marking a lower end of a page of the continuous form, based on the displacement, a shortest distance to the holes from the page boundary in the side portions, and a reference marker length for when the displacement is not specified with respect to each of the upper marker and the lower marker; calculating image-formation start positions of the upper marker and the lower marker based on the displacement, the distance, the reference marker length, and a length of the image forming area in the sub-scanning direction; and performing, with respect to the image forming apparatus, control of the image formation of the upper marker and the lower marker in the side portions from the image-formation start positions calculated over the marker lengths calculated.

According to still another aspect of the present invention, a computer program product includes a computer-usable medium having computer-readable program codes embodied in the medium for controlling the image forming apparatus, and the program codes when executed causes a computer to execute the image-formation control method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
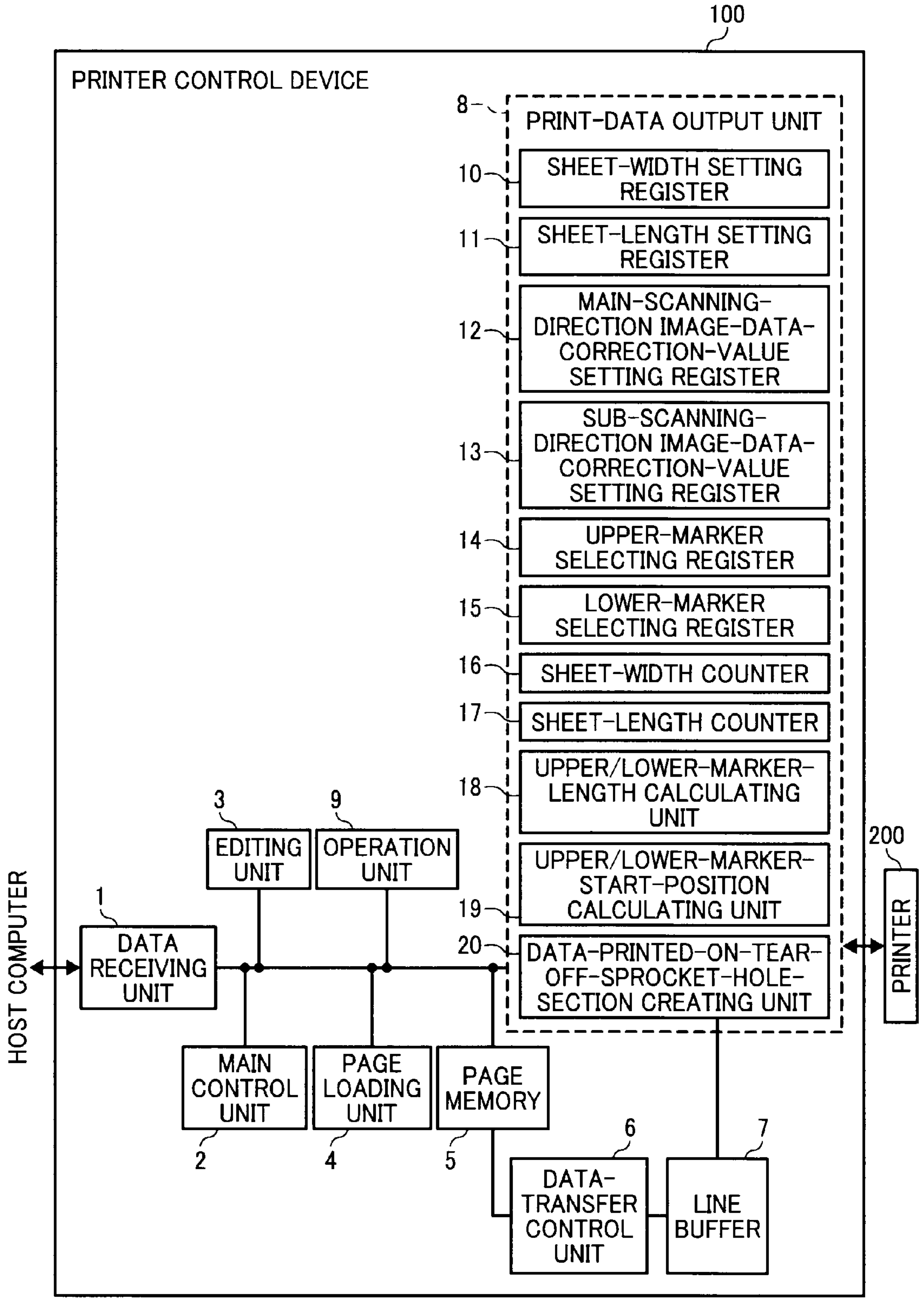
FIG. 1 is a functional block diagram of a schematic configuration of a printer system according to an embodiment of the present invention.

Exemplary embodiments of the present invention are described in detail below with reference to the accompanying drawings. FIG. 1 is a functional block diagram of a schematic configuration of a printer system according to the present embodiment.

The printer system according to the present embodiment includes, as illustrated in FIG. 1, a printer control device 100 and a printer 200. The printer control device 100 receives print job information from a host computer or the like and causes the printer 200 to form an image corresponding to the print job information on continuous printing paper. The printer control device 100 performs conversion, based on print information of each page included in the print job information received, to print image data to be applied upon printing that page by the printer 200 and outputs it to the printer 200.

Operations for the printing by the printer 200 may be controlled as the print image data is output to the printer 200. Although the printer control device 100 in the present embodiment is configured separately from the printer 200, the configuration is not limited thereto. For example, the printer control device may be included in a printer device. In that case, a printer engine corresponds to functions of the printer 200. Moreover, the printer control device 100 may be implemented by a typical computer including a CPU, a memory, and the like. In that case, the printer control device 100 may be implemented as a printer driver that controls, on the computer, printing operations of the printer.

A data receiving unit 1 illustrated in FIG. 1 is configured to receive from the host computer various data such as print job information. A main control unit 2 controls each element of the printer control device 100 in accordance with a predetermined control program, and analyzes data received by the data receiving unit 1 and sends them to an editing unit 3.

The editing unit 3 edits the data sent from the main control unit 2 into a command and a parameter, which are for a loading process, and sends them to a page loading unit 4. The page loading unit 4 generates bitmap print image data in accordance with the command and the parameter received from the editing unit 3 and loads the bitmap print image data into a page memory 5.

When the page loading unit 4 finishes the loading of the print image data for one page into the page memory 5, the main control unit 2 sets a head address and the number of transferred bytes of the print image data loaded in the page memory 5 in a data-transfer control unit 6.

An operation unit 9 is configured to receive from an operator various input operations including settings to displace an image printing area, in which the print image data is to be printed, from a standard position that becomes a reference for printing on the continuous printing paper PP in a main-scanning direction and a sub-scanning direction. If, for example, positional adjustment is necessary between printing positions of items to be printed on each printed page of the print job information generated by an application program of the host computer and recording positions of corresponding printed items included in pre-printed contents of the continuous printing paper set in the printer 200, in order to adjust the printing positions to the recording positions, the operator, by operating the operation unit 9, sets a displacement in the main-scanning direction and the sub-scanning direction for displacing the image printing area, in which an image based on the print image data is printed, by a necessary distance from the standard position that becomes the reference for printing.

Upon such an operation, the main control unit 2 rewrites, based on the displacement set via the operation unit 9, a value set at a predetermined address in the printer 200 to a value corresponding to the set displacement, thereby changing a write start position of the print image data output from a print-data output unit 8 onto the paper.

The print-data output unit 8 includes a sheet-width setting register 10, a sheet-length setting register 11, a main-scanning-direction image-data-correction-value setting register 12, a sub-scanning-direction image-data-correction-value setting register 13, an upper-marker selecting register 14, a lower-marker selecting register 15, a sheet-width counter 16, a sheet-length counter 17, an upper/lower-marker-length calculating unit 18, an upper/lower-marker-start-position calculating unit 19, and a data-printed-on-tear-off-sprocket-hole-section creating unit 20.

The main control unit 2 sets a sheet width and a sheet length of the continuous printing paper PP used by the printer 200 in the sheet-width setting register 10 and the sheet-length setting register 11, respectively. The main control unit 2 sets the displacements in the main-scanning direction and in the sub-scanning direction that have been set via the operation unit 9 in the main-scanning-direction image-data-correction-value setting register 12 and the sub-scanning-direction image-data-correction-value setting register 13, respectively. The main control unit 2 sets, based on a command included in data transmitted from the host computer, a type of an upper marker to be printed (later described) with respect to a perforated line at an upper portion of an image forming area in the upper-marker selecting register 14. The main control unit 2 sets a type of a lower marker to be printed (later described) with respect to a perforated line at a lower portion of the image forming area in the lower-marker selecting register 15.

The upper marker MK1 is a mark that indicates the upper end of each page of the continuous printing paper PP. The lower marker MK2 is a mark that indicates the lower end of each page of the continuous printing paper PP.

As the upper marker and the lower marker in the present embodiment, a one-line pattern and a two-line pattern are prepared, respectively. Choices of these patterns between the upper and lower markers are arbitrarily settable. If, for example, the one-line pattern is formed at both a start position and an end position of each job and a two-line pattern is formed at each position between the start position and the end position of each job, breaks between jobs are easily identifiable from the printed result.

After setting of the values into these various registers by the main control unit 2, the data-transfer control unit 6 transfers the print image data from the page memory 5 to a line buffer 7 based on the data-transfer start address and the number of transfers.

After the print image data have been transferred to the line buffer 7 to some extent, the print-data output unit 8 reads the print image data from the line buffer 7 in synchronization with a print-image-data request signal received from the printer 200 and sends the read one line of the print image data per byte to the printer 200.

The sheet-width counter 16 is configured to count the recording position in the main-scanning direction when the print image data are sent. The sheet-length counter 17 is configured to count the recording position in the sub-scanning direction when the print image data are sent.

The upper/lower-marker-length calculating unit 18 calculates the lengths of the upper marker and the lower marker in the sub-scanning direction, which are to be recorded on the continuous printing paper PP. More particularly, the upper/lower-marker-length calculating unit 18 calculates the length of the upper marker MK1 and the length of the lower marker MK2 based on the displacement in the sub-scanning direction that has been set in the sub-scanning-direction image-data-correction-value setting register 13, a shortest distance L to the sprocket holes from the page boundary in the tear-off sprocket-hole section, and a reference marker length M2 for when a displacement is not specified with respect to each of the upper marker MK1 and the lower marker MK2.

The upper/lower-marker-start-position calculating unit 19 calculates the print start positions in the sub-scanning direction of the upper marker and the lower marker, which are to be recorded on the continuous printing paper PP. More particularly, the upper/lower-marker-start-position calculating unit 19 calculates the print start position of the upper marker MK1 and the print start position of the lower marker MK2 based on the displacement, the distance L, the reference marker length M2, and the length M1 of the image printing area in the sub-scanning direction.

The data-printed-on-tear-off-sprocket-hole-section creating unit 20 creates print data for a tear-off sprocket-hole section (white data representing no printing).

Figure 2:
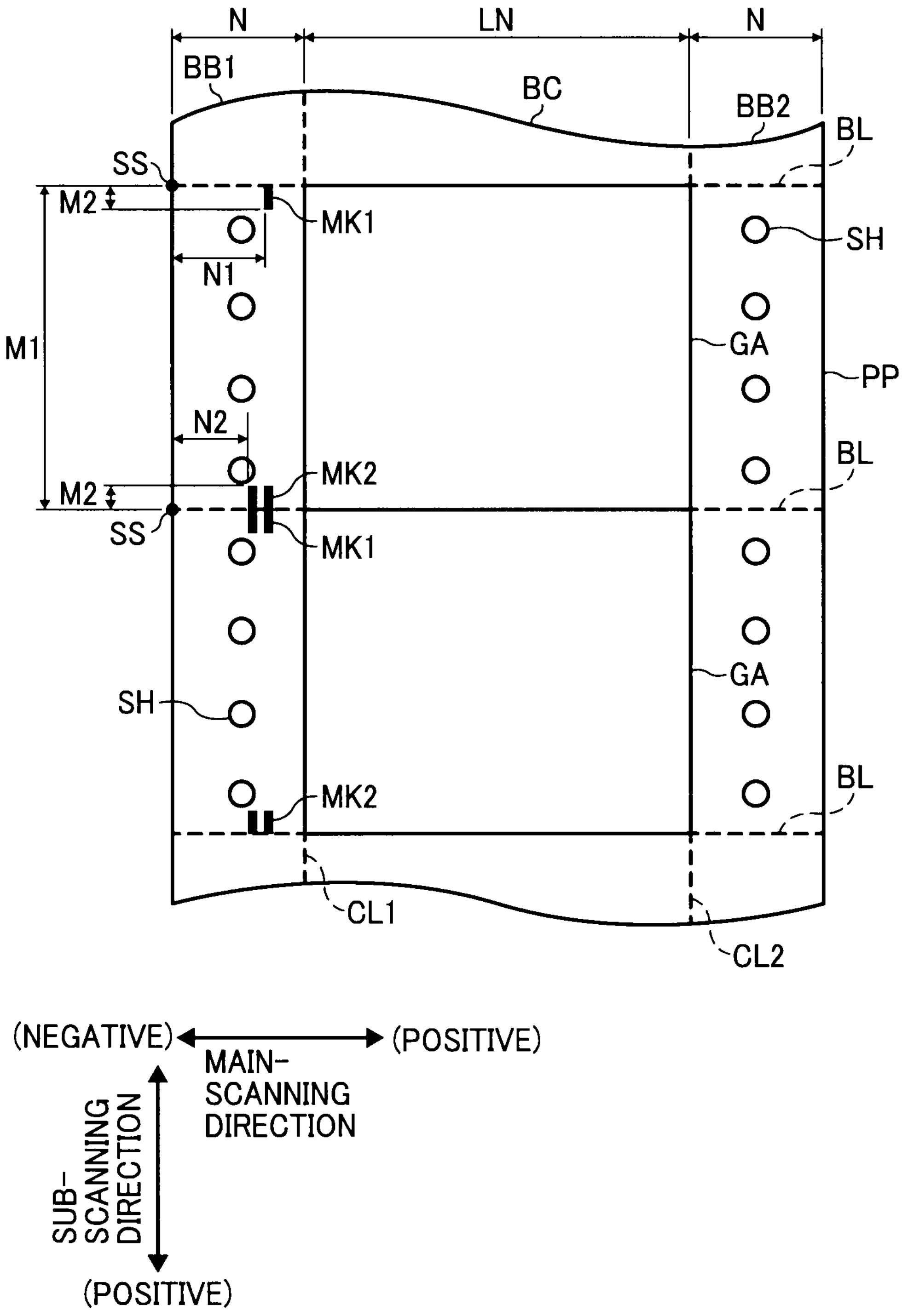
FIG. 2 is a schematic diagram that illustrates a relation between a surface of continuous printing paper and an image printing area.

FIG. 2 is a schematic diagram that illustrates the relation between the surface of the continuous printing paper PP and the image printing areas GA in which the printer 200 prints the print image data of one page. FIG. 2 illustrates a state in which the operator has made no operation to displace the image printing area GA with respect to the printing area of the continuous printing paper PP and this state is a standard of a print state in the present embodiment. In this standard print state, the printing area of one page of the continuous printing paper PP matches the image printing area GA in which the printer 200 prints the print image data of one page. FIG. 2 also illustrates the print start positions of the later-described upper marker MK1 and lower marker MK2 when the image printing area GA is not displaced.

As illustrated in FIG. 2, the continuous printing paper PP includes a portion having a length LN at its center in the main-scanning direction and this portion is set as a printing area BC Side portions of the continuous printing paper PP, that is, portions each having a width N outside the printing area BC, have tear-off sprocket-hole sections BB1 and BB2 each having a plurality of sprocket holes SH provided at predetermined intervals in the sub-scanning direction, which are holes to be engaged with a tractor feeder (not illustrated) used by the printer 200 to convey the continuous printing paper PP.

At the boundary between the printing area BC and the tear-off sprocket-hole sections BB1 and BB2, perforated lines CL1 and CL2 are provided so that the tear-off sprocket-hole sections BB1 and BB2 are able to be torn off and separated from the printing area BC.

The continuous printing paper PP has an area of a length M1 in the sub-scanning direction (the sheet conveying direction), which is set as a printing area of one page, and a perforated line BL for separation into printing areas is provided per length M1.

The printing area of one page of the continuous printing paper PP has the width LN in the main-scanning direction that is defined by the printing area BC and the length M1 in the sub-scanning direction that is defined by the interval between the perforated lines BL.

Each of areas obtained by dividing an area having the width of the printing area BC at intervals between the perforated lines BL is a reference position of the image printing area GA in which an image of one page is printed.

In a printing mechanism of the printer 200, a print start position SS is provided at a position displaced upstream in the main-scanning direction from the print start position of the image printing area GA of each page by the width N in the main-scanning direction of the tear-off sprocket-hole section BB1 so that the upper marker MK1 and the lower marker MK2 are printable on the tear-off sprocket-hole section BB1 upstream in the main-scanning direction of the printing area BC of the continuous printing paper PP. This print start position SS is the reference position being the standard of the print position.

The upper marker MK1 and the lower marker MK2 are recorded in the following manner in the standard state. As described above, each of the upper marker MK1 and the lower marker MK2 is a one-line pattern or a two-line pattern depending on the position in the job and has a length of a reference marker length M2 (reference length) in the sub-scanning direction.

In FIG. 2, the upper image printing area GA is an area in which an image of a first page of the print job is printed, and the lower image printing area GA is an area in which an image of a second page of the print job is printed (illustration of a third page and those after the third page being omitted, but the second page not being the last page). In this case, a one-line upper marker MK1 is recorded, starting from a position at a distance N1 in the main-scanning direction from the left side of the paper, at an upper portion of the first page of the print job. A two-line lower marker MK2 is recorded, starting from a position at a distance N2 in the main-scanning direction from the left side of the paper, at a lower portion of the page.

Another two-line upper marker MK1 is recorded at an upper portion of the second page of the print job at a position at the distance N2 in the main-scanning direction from the left side of the paper. Another two-line lower marker MK2 is recorded at a lower portion of the page at a position at the distance N2 in the main-scanning direction from the left end of the paper.

Therefore, in this state, the two-line upper and lower markers MK1 and MK2 are recorded continuously across the perforated line BL at the boundary between the first page and the second page of the print job. Moreover, because the one-line upper marker MK1 is recorded at the upper portion of the first page of the print job, the head page of the print job is easily identifiable. Although the illustration thereof is omitted, because a one-line lower marker MK2 is recorded at a lower portion of the last page of the print job, the last page of the print job is also easily identifiable.

Figure 3:
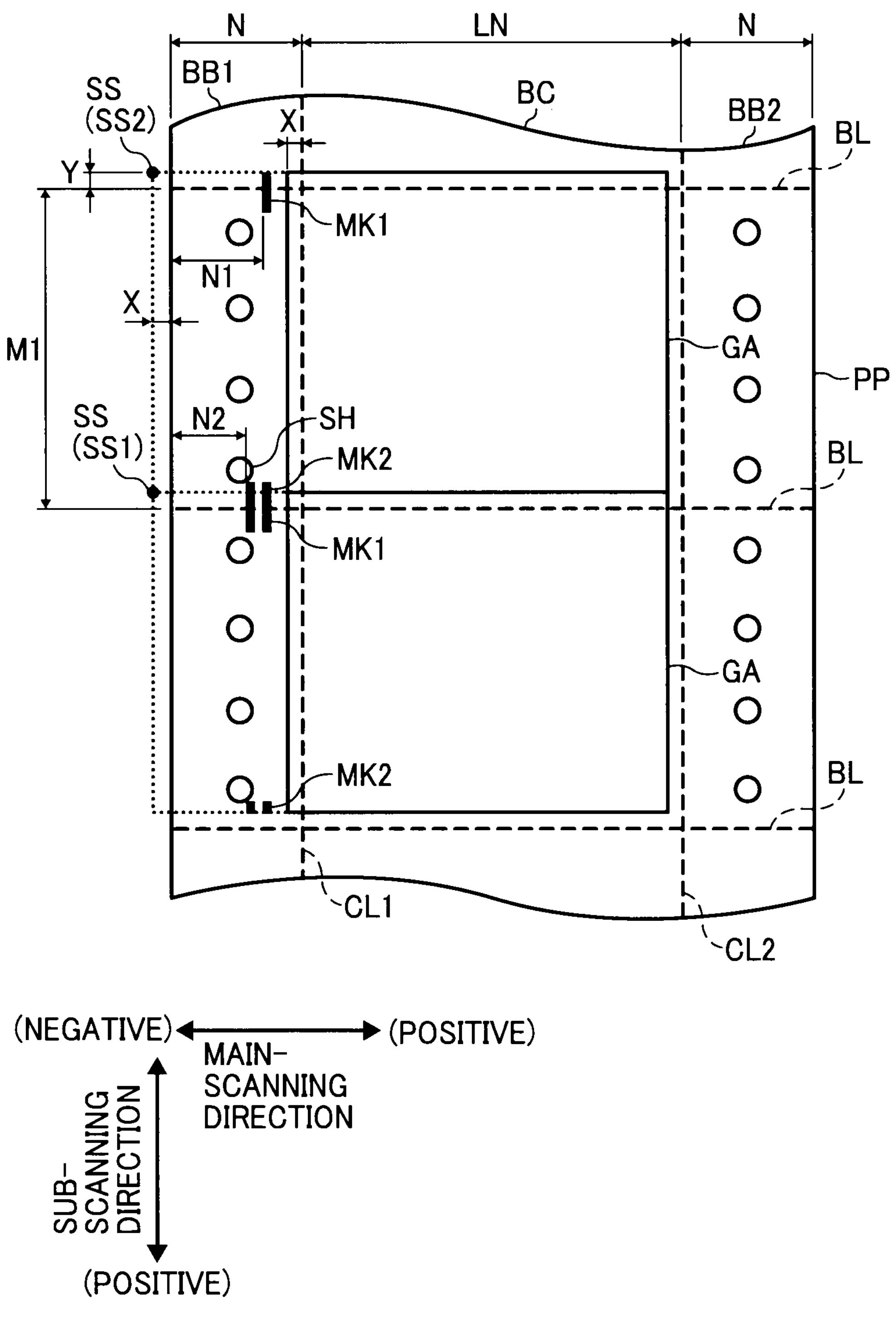
FIG. 3 is a schematic diagram that illustrates a mode of printing with respect to the continuous printing paper when the image printing area is displaced in negative directions in both a sub-scanning direction and a main-scanning direction.

FIG. 3 is a schematic diagram that illustrates a mode of printing with respect to the continuous printing paper PP when the operator operates the operation unit 9 to perform operations (displacement operations) for displacing the image printing area GA in which the printer 200 prints the print image data on the continuous printing paper PP, in negative directions of both the sub-scanning direction and the negative main-scanning direction. In this case, the displacement in the sub-scanning direction is Y and the displacement in the main-scanning direction is X (both X and Y being negative values).

As compared with the state illustrated in FIG. 2, in the state illustrated in FIG. 3, the image printing area GA is displaced in the negative directions, with respect to the printing area of one page of the continuous printing paper PP in both the sub-scanning direction and the main-scanning direction by the displacements according to the operations by the operator. Therefore, the print start position SS is displaced, from an end of the continuous printing paper PP upstream in the main-scanning direction by X in the main-scanning direction and by Y in the sub-scanning direction.

With reference to the example illustrated in FIG. 3 where the image printing area GA is displaced by Y in the sub-scanning direction, the lengths and the print start positions of the upper marker MK1 and the lower marker MK2 are described below. In the following example with reference to FIGS. 3 and 4, L is the shortest distance from a perforated line BL to a closest one of the sprocket holes SH in the negative direction (the displaced direction of Y). As described above, M1 is the interval between the perforated lines BL in the sub-scanning direction. The reference marker length M2 is set to a value smaller than L.

Figure 4:
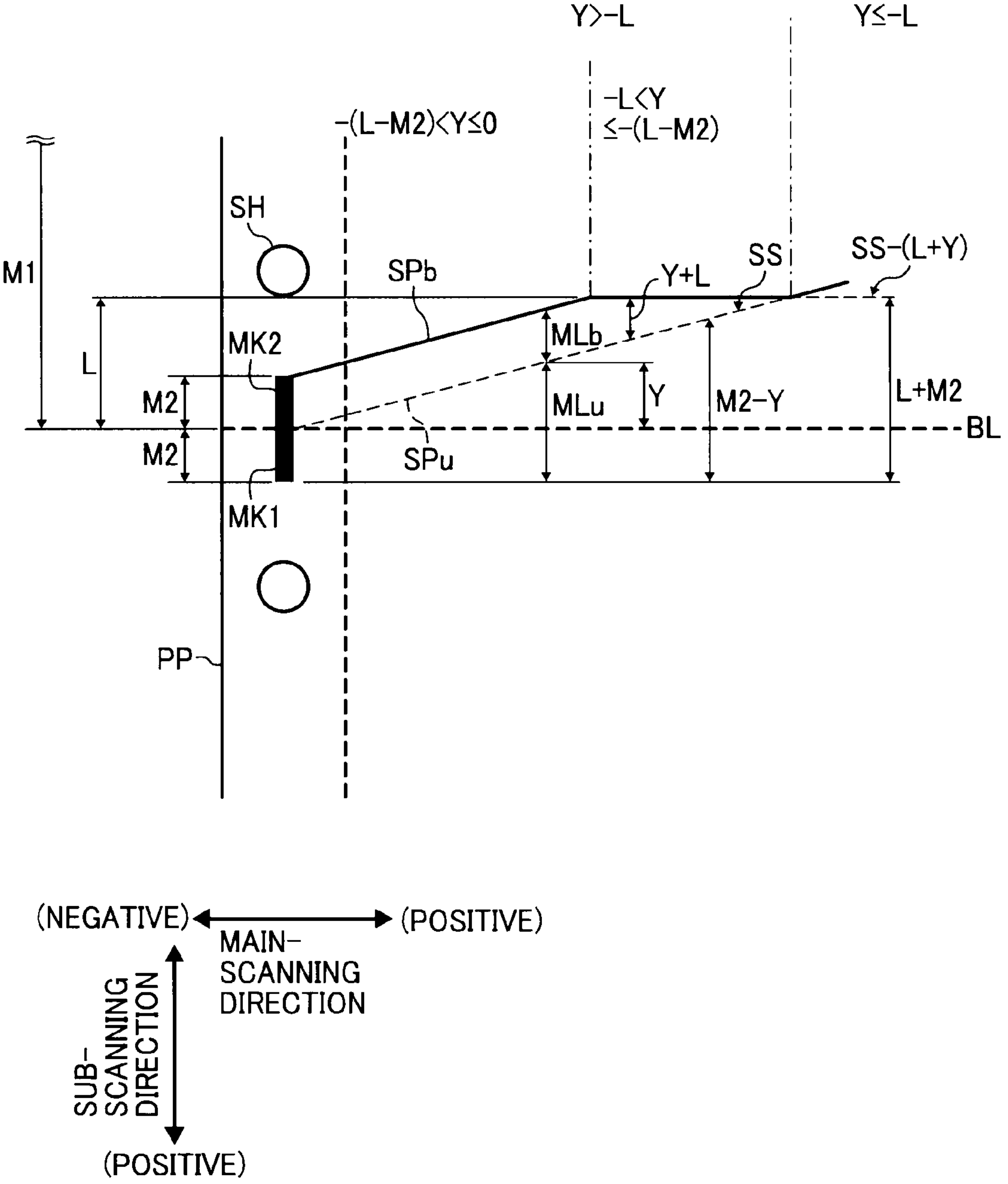
FIG. 4 is a schematic diagram that illustrates lengths and print start positions of an upper marker and a lower marker when the image printing area is displaced by Y (Y<0) in the sub-scanning direction.

FIG. 4 is a schematic diagram that illustrates the lengths and the print start positions of the upper marker MK1 and the lower marker MK2 when, as illustrated in FIG. 3, the image printing area GA is displaced by Y ($Y<0$) in the sub-scanning direction. A broken line SPu indicates the print start position of the upper marker MK1, which changes depending on Y. A line SPb indicates the print start position of the lower marker MK2, which changes depending on Y. MLu indicates the length of the upper marker MK1 (upper marker length), which changes depending on Y. MLb indicates the length of the lower marker MK2 (lower marker length), which changes depending on Y. In FIG. 4, the absolute value of Y increases rightward. For $-L<Y\leq 0$, the length of a perpendicular line drawn from the broken line SPu to the perforated line BL is $|Y|$ (the absolute value of Y). For $Y\leq -L$, the length of a perpendicular line drawn from the line SPb to the perforated line BL is $|Y|$.

The position SS illustrated in FIG. 2 is also displaced in accordance with the displacement. When the image printing area GA has been displaced, the position SS is at an upper end of the page of the image printing area GA that has been displaced by the displacement Y in the sub-scanning direction. Therefore, this position SS will be referred to as "page upper end position of the displaced image printing area GA".

Figure 5:
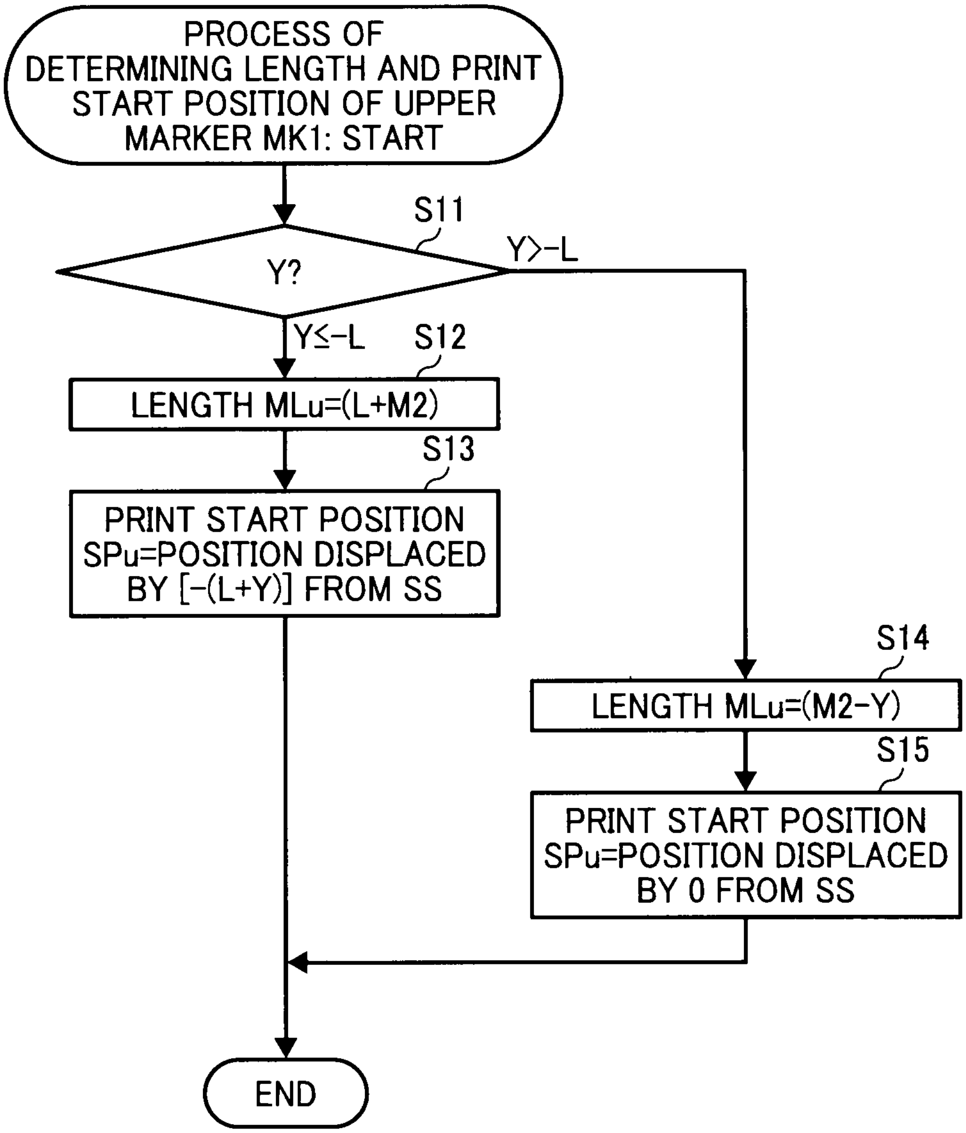
FIG. 5 is a flowchart of a process of determining the length and the print start position of the upper marker when the displacement Y in the sub-scanning direction is negative.

FIG. 5 is a flowchart of a process of determining the length and the print start position of the upper marker MK1 when the displacement Y in the sub-scanning direction is negative.

When the image printing area GA is displaced in the negative direction of the sub-scanning direction, the upper marker MK1 and the lower marker MK2 are displaced in accordance with the displacement of the image printing area GA in the same way if the print start positions are not changed. Therefore, to make the lower end of the upper marker MK1 come to the same position at which it would come when the image printing area GA is not displaced, the upper/lower-marker-length calculating unit 18 and the upper/lower-marker-start-position calculating unit 19 assesses the value of the specified displacement Y (Step S11). If $Y>-L$, the upper/lower-marker-length calculating unit 18 calculates the length MLu of the upper marker MK1 to be ($M2-Y$) (Step S14). The upper/lower-marker-start-position calculating unit 19 calculates the print start position SPu of the upper marker MK1 in the sub-scanning direction to be the same position (displacement being zero) as the position SS, i.e., the page upper end position of the displaced image printing area GA (SS1 in FIG. 3) (Step S15).

At Step S11, if $Y\leq -L$, i.e., if the displacement Y in the sub-scanning direction is equal to or greater than the distance L, when the print start position of the upper marker MK1 in the sub-scanning direction is the same as the position SS, i.e., the page upper end position of the displaced image printing area GA, the upper marker MK1 may overlap the sprocket hole SH and print stains such as blurring of a printed image of the upper marker MK1 may be generated. Therefore, in this case, the upper/lower-marker-length calculating unit 18 calculates the length MLu of the upper marker MK1 to be ($L+M2$) (Step S12). The upper/lower-marker-start-position calculating unit 19 calculates the print start position SPu of the upper marker MK1 in the sub-scanning direction to be a position displaced by $-(L+Y)$ from the position SS, i.e., the page upper end position of the displaced image printing area GA (SS1 in FIG. 3) (Step S13). Thus, the upper marker MK1 is prevented from overlapping a sprocket hole SH (corresponding to a portion of the broken line SPu being parallel to the perforated line BL in FIG. 4).

Figure 6:
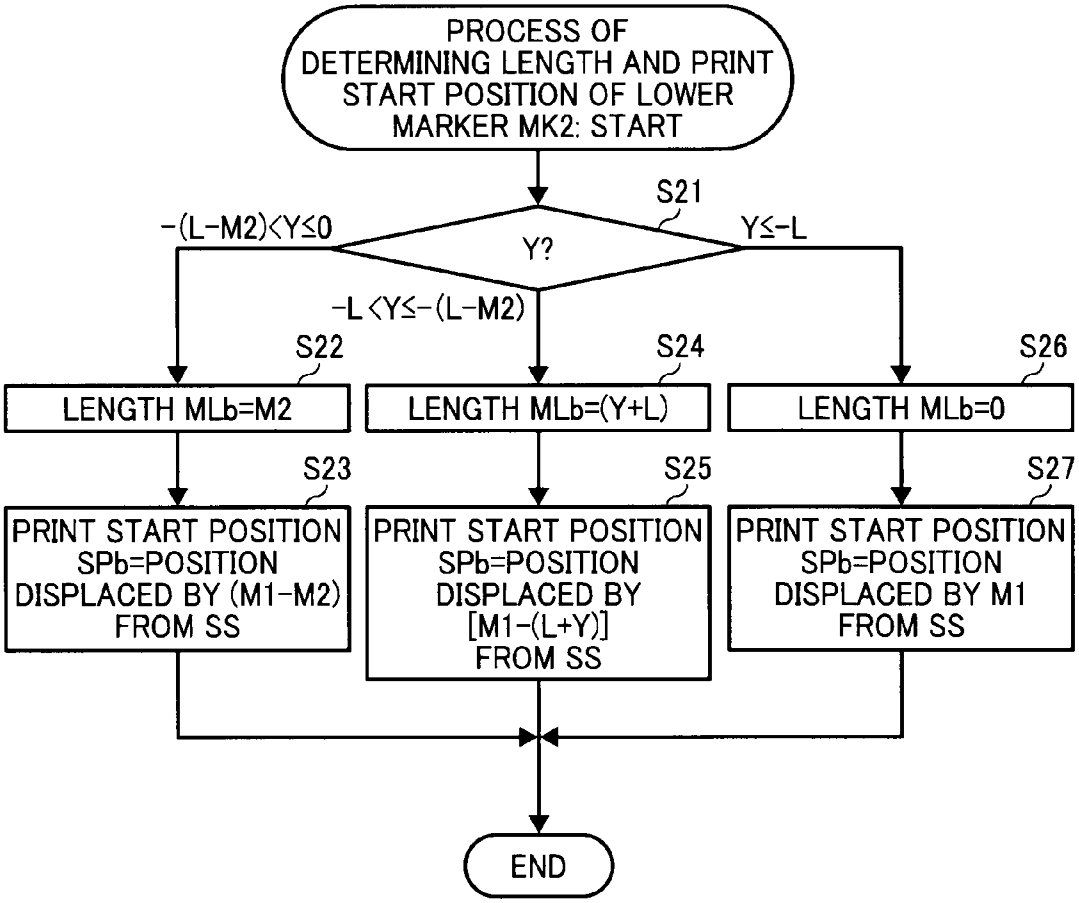
FIG. 6 is a flowchart of a process of determining the length and the print start position of the lower marker when the displacement Y in the sub-scanning direction is negative.

FIG. 6 is a flowchart of a process of determining the length and the print start position of the lower marker MK2 when the displacement Y in the sub-scanning direction is negative.

Similarly, as to the lower marker MK2, the upper/lower-marker-length calculating unit 18 and the upper/lower-marker-start-position calculating unit 19 assesses the value of the specified displacement Y (Step S21). If $-(L-M2)<Y\leq 0$, i.e., if the displacement $|Y|$ of the image printing area GA in the sub-scanning direction is smaller than the value ($L-M2$), the upper/lower-marker-length calculating unit 18 calculates the length MLb of the lower marker MK2 to be the reference marker length M2 (Step S22). The upper/lower-marker-start-position calculating unit 19 calculates the print start position SPb of the lower marker MK2 in the sub-scanning direction to be a position displaced by (M1−M2) from the position SS, i.e., the page upper end position of the displaced image printing area GA (SS2 in FIG. 3) (Step S23).

At Step S21, when −L<Y≤−(L−M2), i.e., if the displacement |Y| of the image printing area GA in the sub-scanning direction is equal to or greater than (L−M2) and smaller than L, when the print start position of the lower marker MK2 in the sub-scanning direction is printed at the position displaced by (M1−M2) from the print start position SS, the lower marker MK2 may overlap a sprocket hole SH and print stains such as blurring of a printed image of the lower marker MK2 may be generated.

Therefore in this case, the upper/lower-marker-length calculating unit 18 calculates the length MLb of the lower marker MK2 to be (L+Y) (Step S24). The upper/lower-marker-start-position calculating unit 19 calculates the print start position SPb of the lower marker MK2 in the sub-scanning direction to be a position displaced by [M1−(L+Y)] from the position SS, i.e., the page upper end position of the displaced image printing area GA (SS2 in FIG. 3) (Step S25). Thus, the lower marker MK2 is prevented from overlapping the sprocket hole SH (corresponding to a portion of the broken line SPb, which is parallel to the perforated line BL in FIG. 4).

At Step S21, if Y≤−L, i.e., if the displacement |Y| of the image printing area GA in the sub-scanning direction is equal to or greater than the distance L, it is impossible to form the lower marker MK2 below (in the drawing) a sprocket hole SH. Therefore, the upper/lower-marker-length calculating unit 18 calculates the length MLb of the lower marker MK2 to be 0 (Step S26). The upper/lower-marker-start-position calculating unit 19 calculates the print start position SPb of the lower marker MK2 in the sub-scanning direction to be a position displaced by M1 from the position SS, i.e., the page upper end position of the displaced image printing area GA (SS2 in FIG. 3) (Step S27). In this case, because the lower marker MK2 is not printed, the print start position in the sub-scanning direction may be an arbitrary position.

In this case, the marker across the perforated line BL is formed only using the upper marker MK1.

The length and the print start position in the sub-scanning direction of each marker are calculated in accordance with the value of Y in the above manner. Consequently, if Y<0, the markers are printable across the perforated lines BL without overlapping the sprocket holes SH.

Figure 7:
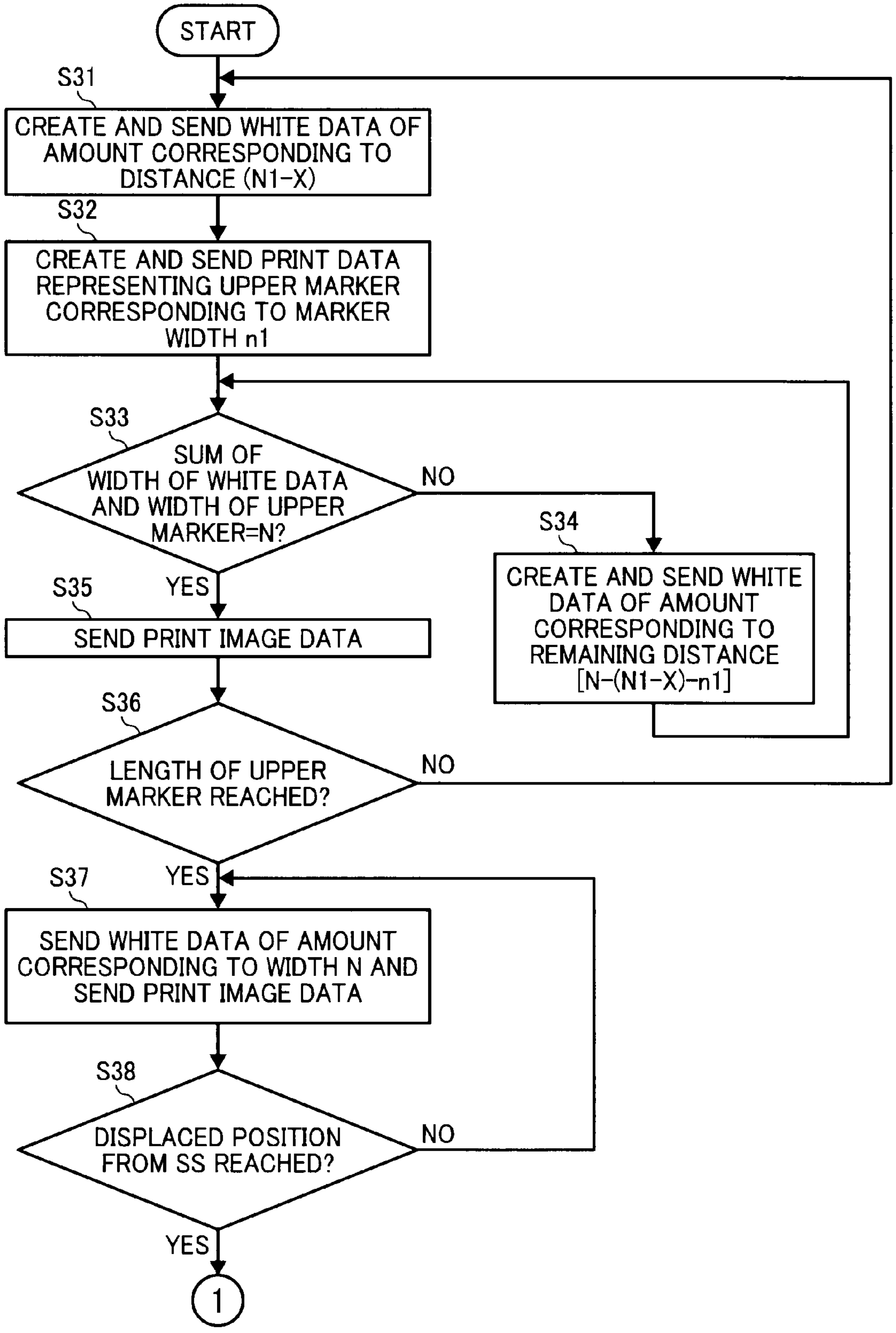
FIG. 7 is a flowchart of operations of a printer control device according to the present embodiment.
Figure 8:
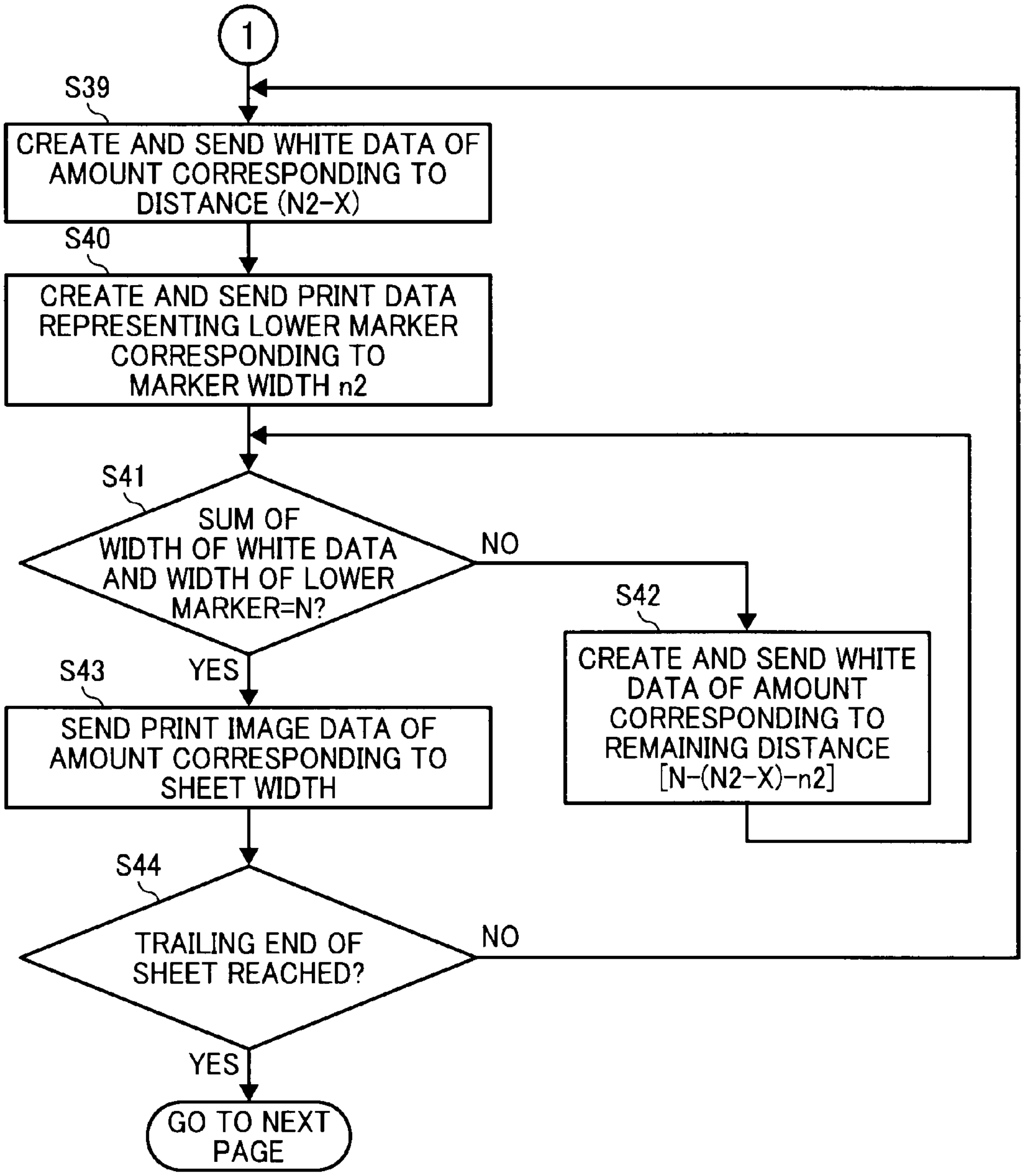
FIG. 8 is a flowchart of operations of the printer control device according to the present embodiment.

Operations of the printer control device 100 according to the present embodiment are described below with reference to the example illustrated in FIG. 3 where the print image data is displaced in the negative directions of the main-scanning direction and the sub-scanning direction (the displacement in the main-scanning direction being X, the displacement in the sub-scanning direction being Y, X<0, and Y<0). FIGS. 7 and 8 are flowcharts of the operations of the printer control device 100 according to the present embodiment.

In the following description, the lengths MLu and MLb and the print start positions SPu and SPb in the sub-scanning direction of the upper marker MK1 and the lower marker MK2 for a case in which −(L−M2)<Y≤0 are used, but if Y is of another value, these values may be changed in the above manner.

If −(L−M2)<Y≤0, the print start position SPu of the upper marker MK1 in the sub-scanning direction is the position displaced by 0 from the position SS, i.e., the page upper end position of the displaced image printing area GA (SS1 in FIG. 3). Therefore, formation of the upper marker MK1 starts from the first line.

If a print-image-data request signal is received from the printer 200 with respect to an image of a first page of a certain job, the data-printed-on-tear-off-sprocket-hole-section creating unit 20 creates white data of an amount corresponding to a distance up to a position immediately before a formation start position of the upper marker MK1 in the main-scanning direction and sends the created white data to the printer 200 byte by byte. In this example, if a one-line mark is formed at a position at the distance N1 from the side of the paper regardless of the value of X, as understood from FIG. 3, the upper marker MK1 is formed at the position at a distance (N1−X) from the position SS, i.e., the page upper end position of the displaced image printing area GA (SS2 in FIG. 3), and thus the data-printed-on-tear-off-sprocket-hole-section creating unit 20 creates the white data of the amount corresponding to the distance (N1−X) and sends the created white data to the printer 200 byte by byte (Step S31).

The data-printed-on-tear-off-sprocket-hole-section creating unit 20 counts up the sheet-width counter 16 every time it sends one byte of the white data to the printer 200. After sending the amount of the white data corresponding to (N1−X) to the printer 200, the data-printed-on-tear-off-sprocket-hole-section creating unit 20 creates data of the pattern of the marker that has been set in the upper-marker selecting register 14 (in this example, a one-line pattern, being a series of black dots corresponding to the width of the line of the marker) as print data of the upper marker MK1 and sends the created data to the printer 200 (Step S32).

After that, the data-printed-on-tear-off-sprocket-hole-section creating unit 20 determines whether the sum of the width of the white data and the width of the upper marker has reached the width N of the tear-off sprocket-hole section BB1 (Step S33). If the sum of the width of the white data and the width of the upper marker has not reached the width N of the tear-off sprocket-hole section BB1 (No at Step S33), the data-printed-on-tear-off-sprocket-hole-section creating unit 20 creates white data of an amount corresponding to the remaining distance and sends the created data to the printer 200 (Step S34), and repeats Step S34 until the sum of the widths reaches the width N. This remaining distance is [N−(N1−X)−n1], where n1 is the width of the pattern of the marker.

If the sum of the widths has reached the width N (Yes at Step S33), that is, after the white data and print data of the upper marker MK1 of the amount corresponding to the width N of the tear-off sprocket-hole section BB1 have been sent to the printer 200, the print-data output unit 8 reads the print image data from the line buffer 7 and sends the print image data of the amount corresponding to the sheet width set in the sheet-width setting register 10 to the printer 200 (Step S35). As a result, one line worth of both the print image data and the upper marker MK1 is recorded on the first page of the continuous printing paper PP.

When the start position of the marker is displaced by X, the print image data read from the line buffer 7 may overlap the print position of the print data of the upper marker MK 1 or white data, which are output from the data-printed-on-tear-off-sprocket-hole-section creating unit 20. This happens when [N−(N1−X)−n1] is a negative value. In this case, an OR output of the print image data and the print data of the upper marker MK1 or the white data is used as the print data.

If the data amount of one line of the print image data read from the line buffer 7 is greater than the amount of data corresponding to the sheet width set in the sheet-width setting register 10, as to the excessive portion of the one line of data exceeding the data amount corresponding the sheet width, the print image data are read from the line buffer 7, but not sent to the printer 200.

After the one line of the print image data is sent to the printer 200, the print-data output unit 8 counts up the sheet-length counter 17, and repeats the sending of the pattern of the upper marker MK1 in the same manner until the sheet-length counter 17 indicates the number of lines corresponding to the length (M2−Y) of the upper marker MK1 (No at Step S36). Consequently, both the print image data and the upper marker MK1 are recorded on the first page of the continuous printing paper PP.

After that, until the sheet-length counter 17 indicates a value that is one less than the value corresponding to the print start position of the lower marker MK2 in the sub-scanning direction, i.e., from the value corresponding to the position displaced by (M1−M2) from the position SS that is the page upper end position of the displaced image printing area GA (SS1 in FIG. 3) (No at Step S38), as an operation for a line without a marker, the sending the white data of an amount corresponding to the width N of the tear-off sprocket-hole section BB1 to the printer 200 and the sending of the print image data read from the line buffer 7 of an amount corresponding to the sheet width set in the sheet-width setting register 10 to the printer 200 are similarly repeated (Step S37).

When the sheet-length counter 17 indicates the value corresponding to the position displaced by (M1−M2) (Yes at Step S38), the process proceeds to the operation for forming the lower marker MK2.

More particularly, the data-printed-on-tear-off-sprocket-hole-section creating unit 20 creates white data of an amount corresponding to a distance up to a position immediately before the print start position of the lower marker MK2 in the main-scanning direction and sends the created white data to the printer 200 byte by byte. If a two-line mark is formed, regardless of the value of X, at a position at the distance N2 from the side of the sheet, as understood from FIG. 3, the lower marker MK2 is formed at a position in the main-scanning direction at the distance (N2−X) from the position SS, i.e., the page upper end position of the displaced image printing area GA (SS2 in FIG. 3), and thus the data-printed-on-tear-off-sprocket-hole-section creating unit 20 creates white data of an amount corresponding to the distance (N2−X) and sends the created white data to the printer 200 byte by byte (Step S39).

Every time one byte of the white data is sent to the printer 200, the sheet-width counter 16 is counted up. After sending the amount of the white data corresponding to (N2−X) to the printer 200, the data-printed-on-tear-off-sprocket-hole-section creating unit 20 creates data of the pattern of the marker set in the lower-marker selecting register 15 (in this example, a two-line pattern, being a series of black dots corresponding to the width of the left line of the marker, a series of white dots corresponding to the interval between the lines, and a series of black dots corresponding to the width of the right line of the marker) as the print data of the lower marker MK2 and sends the created data to the printer 200 (Step S40). After that, if the sum of the width of the white data and the width of the lower marker has not reached the width N of the tear-off sprocket-hole section BB1 (No at Step S41), the data-printed-on-tear-off-sprocket-hole-section creating unit 20 creates white data of an amount corresponding to the remaining distance and sends the created white data to the printer 200 (Step S42). This remaining distance is [N−(N2−X)−n2], where n2 is the width of the pattern of the marker.

After the white data and print data of the lower marker MK2 of the amount corresponding to the width N of the tear-off sprocket-hole section BB1 have been sent to the printer 200 (Yes at Step S41), as described above, the print-data output unit 8 reads the print image data from the line buffer 7 and sends the print image data of an amount corresponding to the sheet width set in the sheet-width setting register 10 to the printer 200 (Step S43). As a result, one line worth of both the print image data and the lower marker MK2 is recorded on the first page of the continuous printing paper PP.

After one line of the print image data has been sent to the printer 200, the sheet-length counter 17 is counted up, and the sending of the pattern of the lower marker MK2 is repeated in the same manner until the sheet-length counter 17 indicates the number of lines corresponding to M1 indicating the trailing end of the page (No at Step S44). Consequently, both the print image data and the lower marker MK2 are recorded on the first page of the continuous printing paper PP.

After that, the print-data output unit 8 resets the sheet-length counter 17 and regards as valid the data set in the upper-marker selecting register 14 and the lower-marker selecting register 15 for specifying the markers to be formed on the next page. In response to a print-image-data request signal received from the printer 200 for the image of the next page, in the same manner as for the first page, as to the next page, the print-data output unit 8 sends the white data and print data of the marker of the amount corresponding to the width N of the tear-off sprocket-hole section BB1 and the print image data read from the line buffer 7 to the printer 200.

Which patterns are to be used for the upper marker and the lower marker on which pages is set by a selecting unit, i.e., the main control unit 2 in accordance with the command included in the data transmitted from the host computer. The amount of the white data output first for each line forming the marker by the data-printed-on-tear-off-sprocket-hole-section creating unit 20 is determined in accordance with both the start position of the marker formed on the sheet and the displacement X of the image printing area GA in the main-scanning direction.

For example, a two-line pattern may be formed as the upper marker. If that is the case, the data-printed-on-tear-off-sprocket-hole-section creating unit 20 sends, for a line forming the upper marker, white data of an amount corresponding to (N2−X) instead of (N1−X) to the printer 200 and thereafter creates data of a two-line pattern as the print data of the upper marker and sends the created data to the printer 200. On the contrary, a one-line pattern may be formed as the lower marker. If that is the case, the data-printed-on-tear-off-sprocket-hole-section creating unit 20 sends, for a line forming the lower marker, white data of an amount corresponding to (N1−X) instead of (N2−X) to the printer 200, and thereafter creates data of a one-line pattern as the print data of the lower marker and sends the created data to the printer 200.

If the print start position of the upper marker MK1 in the sub-scanning direction does not match the print start position SS, until the sheet-length counter 17 indicates a value that is one less than a value corresponding to the print start position, the above-described operation for a line without a marker may be performed.

If the length of the lower marker MK2 is 0, it is unnecessary to perform the operation for forming the lower marker MK2, and after a line without an upper marker MK1 has been reached, the above-described operation corresponding to a line without a marker is repeated until the sheet-length counter 17 indicates the number of lines corresponding to M1 indicating the trailing end of the page.

The case in which the print image data is displaced in the negative direction of the sub-scanning direction has been explained. Next, a case in which the print image data is displaced in the positive direction of the sub-scanning direction will be explained.

Figure 9:
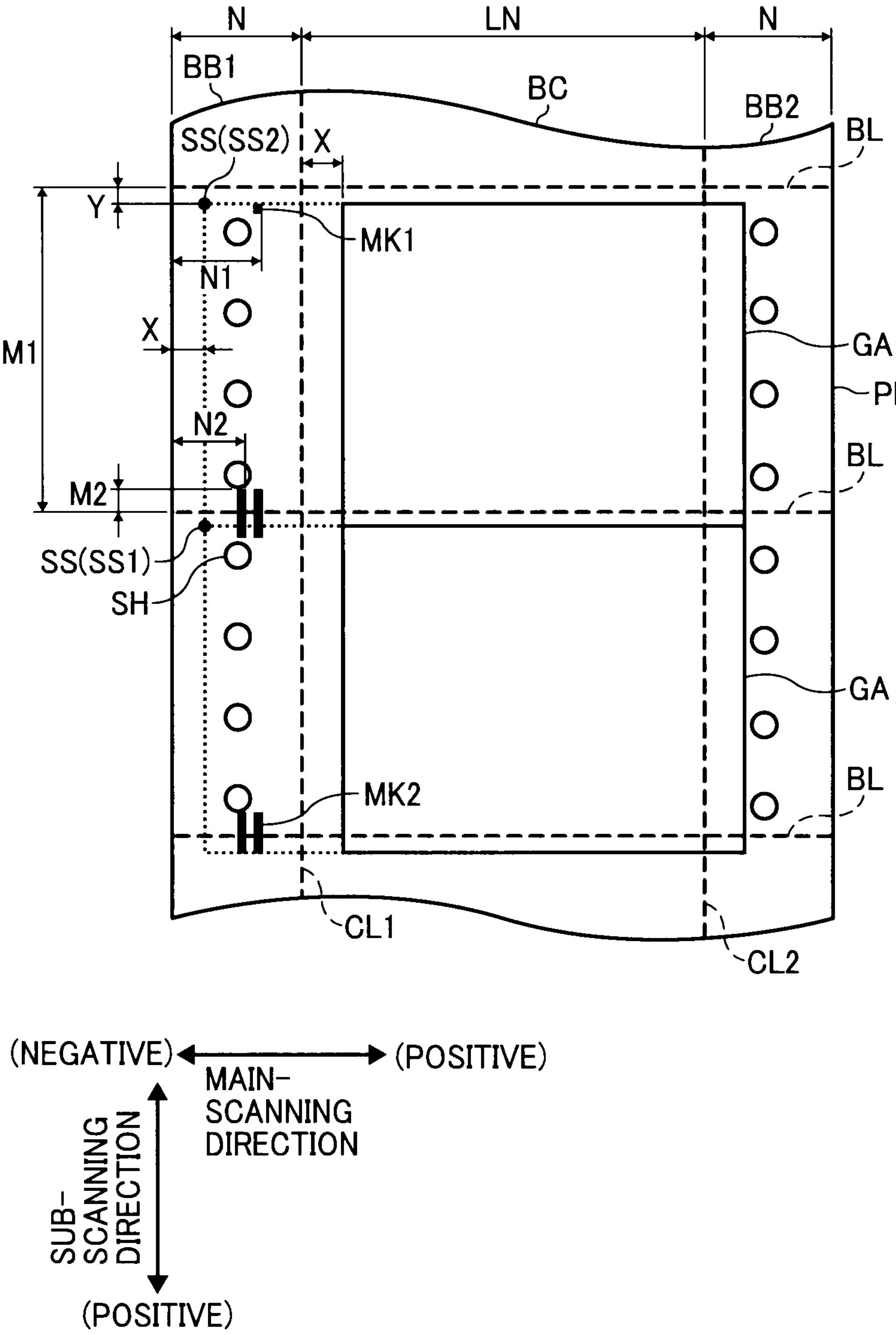
FIG. 9 is a schematic diagram that illustrates a mode of printing with respect to the continuous printing paper when the image printing area is displaced in positive directions in both the sub-scanning direction and the main-scanning direction.

FIG. 9 is a schematic diagram corresponding to FIG. 3 and illustrating a mode of printing with respect to the continuous printing paper PP when the operator performs operations to displace the image printing area GA, in which the printer 200 prints the print image data on the continuous printing paper PP, in positive directions of the sub-scanning direction and the main-scanning direction. In this case also, the displacement in the sub-scanning direction is Y and the displacement in the main-scanning direction is X (both X and Y being positive values).

As compared with the state illustrated in FIG. 2, in the state illustrated in FIG. 9, the printing area GA is displaced, with respect to the printing area of one page of the continuous printing paper PP, in the positive directions of the sub-scanning direction and the main-scanning direction according to the operations by the operator. Therefore, in this case, the print start position SS is displaced, from a side upstream in the main-scanning direction of the continuous printing paper PP, by X in the main-scanning direction, and by Y in the sub-scanning direction.

With reference to the example illustrated in FIG. 9 where the image printing area GA is displaced Y in the sub-scanning direction, the lengths and the print start positions of the upper marker MK1 and the lower marker MK2 are described below. In the following example with reference to FIGS. 9 and 10, L is the distance from the perforated line BL to the closest one of the sprocket holes SH in the positive direction (the displaced direction of Y) of the sub-scanning direction. As described above, M1 is the interval between the perforated lines BL in the sub-scanning direction. The reference marker length M2 is set to a value smaller than L.

Figure 10:
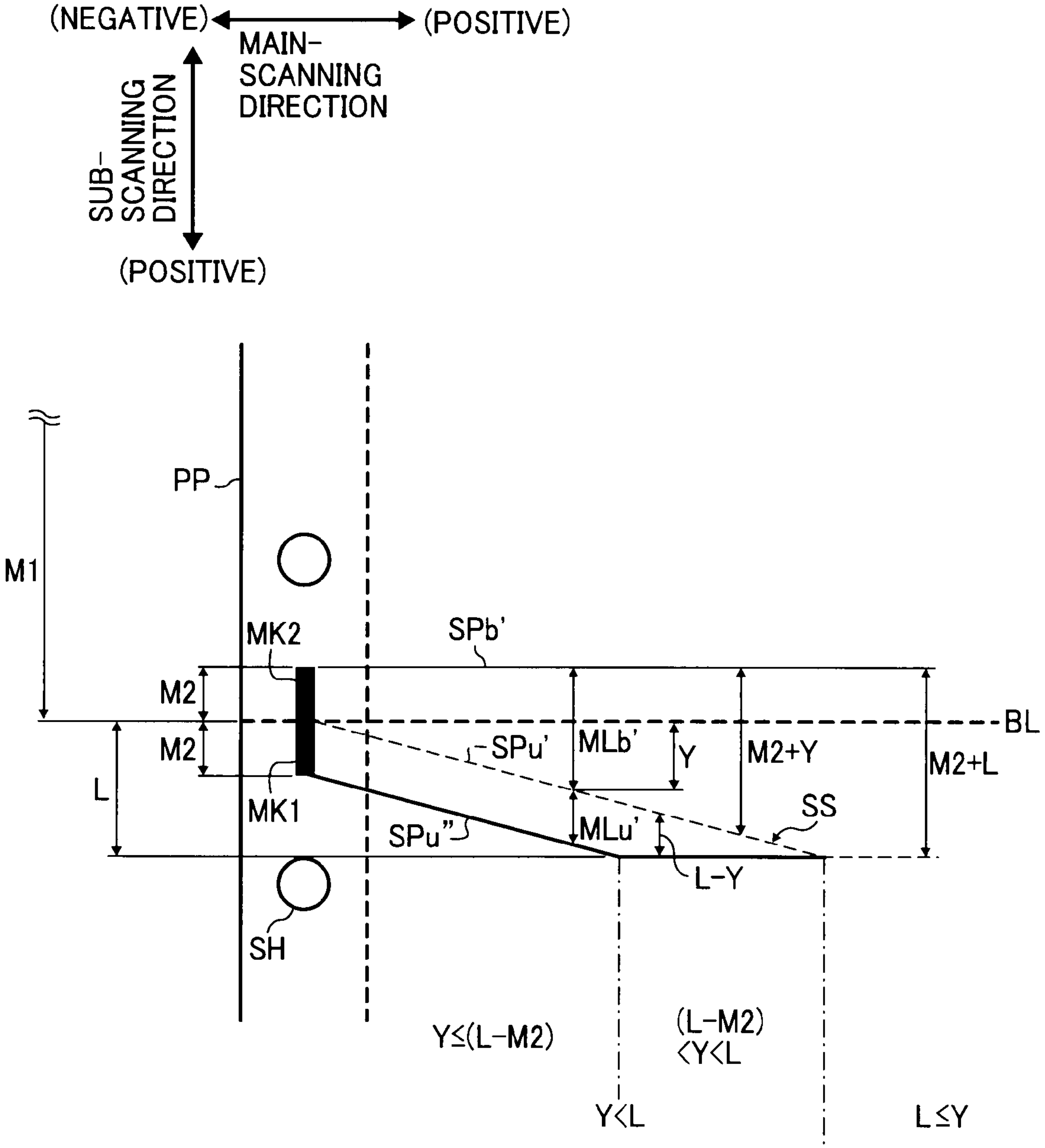
FIG. 10 is a schematic diagram that illustrates the lengths and the print start positions of the upper marker and the lower marker when the image printing area is displaced Y (Y>0) in the sub-scanning direction.

FIG. 10 is a schematic diagram corresponding to FIG. 4 and illustrating the lengths and the print start positions of the upper marker MK1 and the lower marker MK2 when the image printing area GA is displaced in the positive direction of the sub-scanning direction. In this figure also, the displacement of the image printing area GA is Y, but here, Y is a positive value.

A position SS illustrated in FIG. 2 is displaced in accordance with the displacement. When the image printing area GA has been displaced, the position SS is at a position of an upper end of the image printing area GA that has been displaced by the displacement Y in the sub-scanning direction. Therefore, the position SS is referred to as "page upper end position of the displaced image printing area GA".

A broken line SPu' illustrated in FIG. 10 indicates the print start position of the upper marker MK1, which changes depending on Y; a line SPu" indicates the lower end position of the upper marker MK1, which changes depending on Y; a straight line SPb' indicates the print start position of the lower marker MK2; MLu' indicates the length of the upper marker MK1 (upper marker length), which changes depending on Y; and MLb' indicates the length of the lower marker MK2 (lower marker length), which changes depending on Y. Similarly to the case in FIG. 4, (the absolute value of) Y increases rightward in the figure, and if $Y<L$, the length of a perpendicular line drawn from the broken line SPu' to the perforated line BL is Y, and if $L \le Y$, the value of Y is not directly expressed in the figure, but increases rightward in the figure at the same ratio as the ratio before it.

As described with reference to FIG. 4, when the image printing area GA is displaced in the positive direction of the sub-scanning direction, the upper marker MK1 and the lower marker MK2 are displaced in accordance with the displacement of the image printing area GA if their print start positions are not changed.

Figure 11:
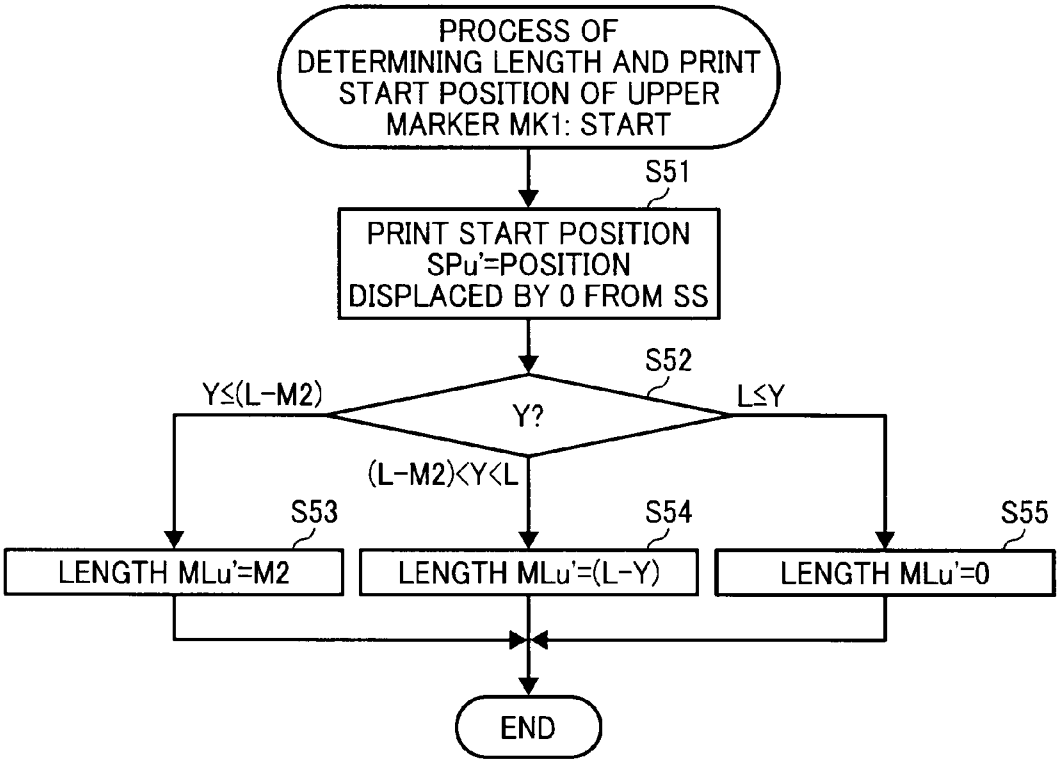
FIG. 11 is a flowchart of a process of determining the length and the print start position of the upper marker when the displacement Y in the sub-scanning direction is positive.

FIG. 11 is a flowchart of a process of determining the length and the print start position of the upper marker MK1 when the displacement Y in the sub-scanning direction is positive.

Because the upper marker MK1 is formed at a position displaced in the positive direction of the sub-scanning direction, in a case like the one illustrated in FIG. 4, there is no possibility that the upper marker MK1 overlaps the upper sprocket hole SH. Therefore, the upper/lower-marker-start-position calculating unit 19 always calculates the print start position SPu' of the upper marker MK1 in the sub-scanning direction to a value equal to the position of SS, i.e., the page upper end position of the displaced image printing area GA (SS1 in FIG. 9) (the displacement being 0) (Step S51).

The upper/lower-marker-length calculating unit 18 assesses the value of the displacement Y (Step S52). If $Y \le (L-M2)$, because there is no possibility that the upper marker MK1 overlaps the lower sprocket hole SH, the upper/lower-marker-length calculating unit 18 calculates the length MLu' of the upper marker MK1 to be the reference marker length M2 (Step S53).

At Step S52, if $(L-M2)<Y<L$ and the length MLu' of the upper marker MK1 is the reference marker length M2, the upper marker MK1 may overlap the sprocket holes SH and print stains such as blurring of the printed image of the upper marker MK1 may be generated. Therefore, in this case, the upper/lower-marker-length calculating unit 18 calculates the length MLu' of the upper marker MK1 to be (L−Y) (Step S54) to prevent the upper marker MK1 from overlapping the sprocket holes SH (corresponding to a portion of the line SPu", which is parallel to the perforated line BL in FIG. 10).

At Step S52, if $L \le Y$, because it is impossible to form the upper marker MK1 above the sprocket holes SH, the upper/lower-marker-length calculating unit 18 calculates the length MLu' of the upper marker MK1 to be 0 (Step S55). In this case, because the upper marker MK1 is not printed, the print start position in the sub-scanning direction may be an arbitrary position.

Figure 12:
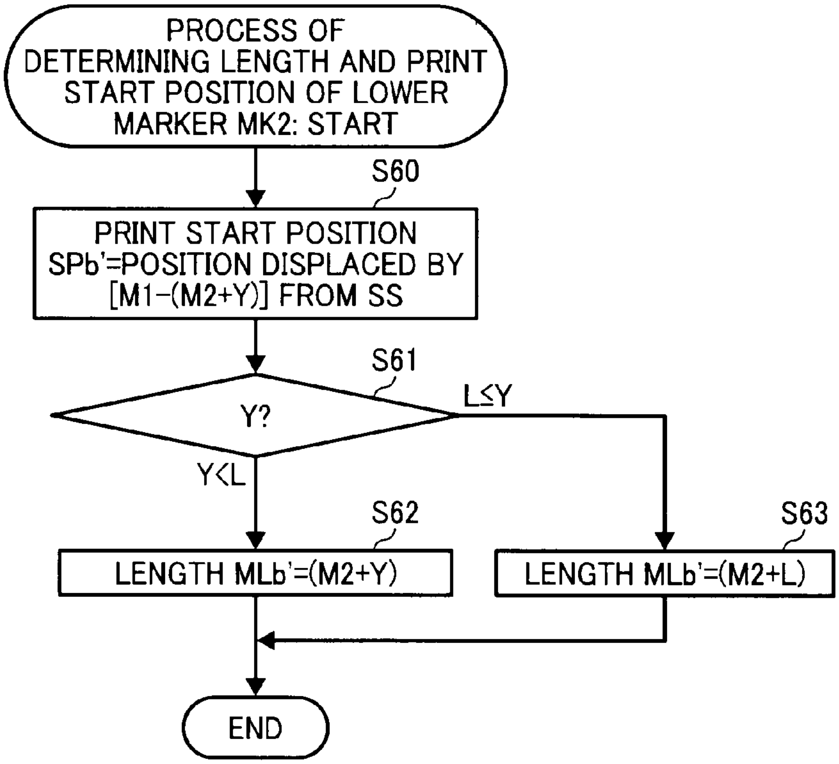
FIG. 12 is a flowchart of a process of determining the length and the print start position of the lower marker when the displacement Y in the sub-scanning direction is positive.
Figure 12:
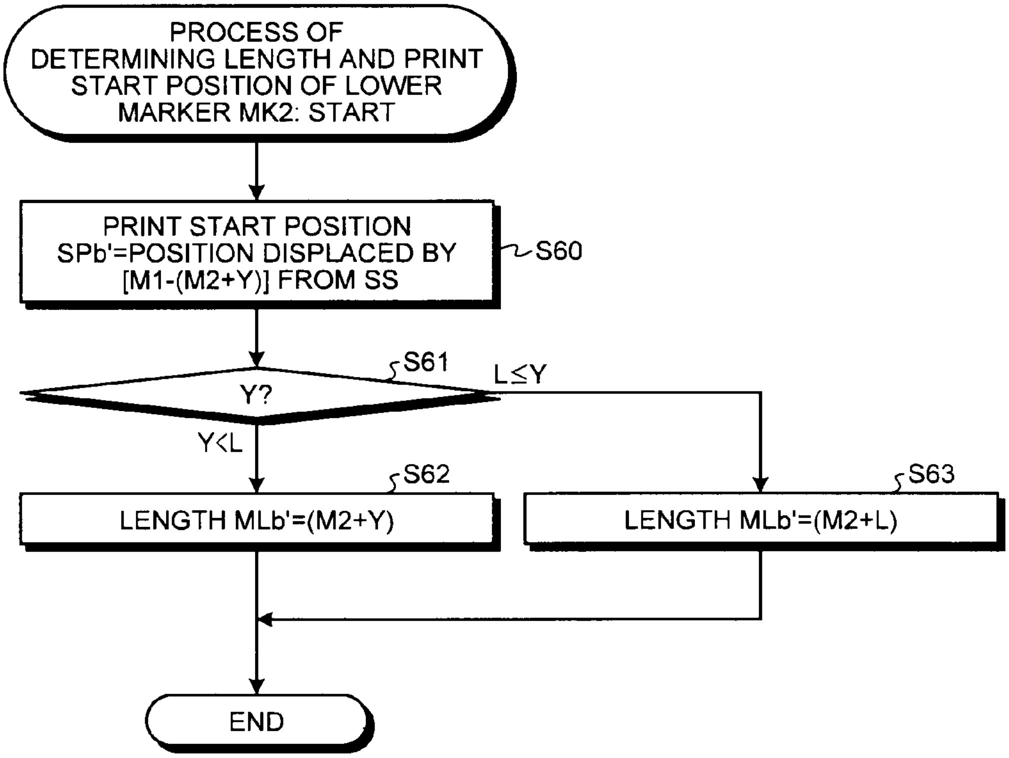

FIG. 12 is a flowchart of a process of determining the length and the print start position of the lower marker MK2 when the displacement Y in the sub-scanning direction is positive.

In order to position the upper end of the lower marker MK2 to the same position as in the case in which the image printing area GA is not displaced, the upper/lower-marker-start-position calculating unit 19 calculates the print start position SPb' of the lower marker MK2 in the sub-scanning direction to be a position displaced by [M1−(M2 Y)] from the position SS, i.e., the page upper end position of the displaced image printing area GA (SS2 in FIG. 9) (Step S60). This means that the print start position is displaced by the same amount as the displacement Y of the image printing area GA upward in FIGS. 9 and 10.

The upper/lower-marker-length calculating unit 18 then assesses the value of the displacement Y (Step S61). If $Y<L$, because the lower marker MK2 does not overlap the sprocket holes SH even if the lower marker MK2 is formed to reach the lower end, the upper/lower-marker-length calculating unit 18 calculates the length MLb' of the lower marker MK2 to be (M2+Y) (Step S62).

At Step S61, if $L \le Y$, when the lower marker MK2 is formed to reach the lower end, the lower marker MK2 overlaps a sprocket hole SH, and thus the upper/lower-marker-length calculating unit 18 calculates the length MLb' of the lower marker MK2 to be (M2+L) (Step S63) to prevent the lower marker MK2 from overlapping the sprocket hole SH (corresponding to a portion of the broken line SPu', which is parallel to the perforated line BL in FIG. 10).

In this case, the marker across the perforated line BL is formed only using the lower marker MK2.

By setting the length and the print start position in the sub-scanning direction of each marker in accordance with the value of Y in the above manner, as long as Y>0, regardless of the value of Y, a marker is printable across a perforated line BL without overlapping the sprocket holes SH.

Operations of the printer control device 100 according to the present embodiment is described below for a case in which the print image data are displaced in the positive directions of the main-scanning direction and the sub-scanning direction (the displacement in the main-scanning direction being X, the displacement in the sub-scanning direction being Y, X>0, and Y>0) like the example illustrated in FIG. 9. These operations are basically similar to the process described with reference to FIGS. 7 and 8, but are different in a length and a print start position of each marker depending on the direction of the displacement.

The operation will be explained using the lengths and the print start positions in the sub-scanning direction of the upper marker MK1 and the lower marker MK2 for when 0<Y≤(L−M2), but if Y is another value, these values may be modified in the above manner.

If 0<Y≤(L−M2), the print start position of the upper marker MK1 in the sub-scanning direction becomes the position displaced by 0 from the position SS, i.e., the page upper end position of the displaced image printing area GA (SS1 in FIG. 9). Therefore, formation of the upper marker MK1 starts from the first line.

If a print-image-data request signal is received from the printer 200 for an image of the first page of a certain job, the data-printed-on-tear-off-sprocket-hole-section creating unit 20 creates white data of an amount corresponding to a distance up to a position immediately before the forming start position of the upper marker MK1 in the main-scanning direction and sends the created data to the printer 200 byte by byte. In this example, if a one-line mark is formed, regardless of the value of X, at a position at a distance N1 from the side of the sheet, as understood from FIG. 9, the upper marker MK1 is formed at a position at a distance (N1−X) from the print start position SS, and thus the data-printed-on-tear-off-sprocket-hole-section creating unit 20 creates white data of an amount corresponding to the distance (N1−X) and sends the created data to the printer 200 byte by byte (Step S31).

Every time one byte of the white data is sent to the printer 200, the sheet-width counter 16 is counted up. After sending the white data of the amount corresponding to (N1−X) to the printer 200, the data-printed-on-tear-off-sprocket-hole-section creating unit 20 creates data of the pattern of the marker set in the upper-marker selecting register 14 as the print data of the upper marker MK1 and sends the created data to the printer 200 (Step S32). After that, the data-printed-on-tear-off-sprocket-hole-section creating unit 20 determines whether the sum of the width of the white data and the width of the upper marker has reached the width N of the tear-off sprocket-hole section BB1 (Step S33). If not reached (No at Step S33), the data-printed-on-tear-off-sprocket-hole-section creating unit 20 creates white data of an amount corresponding to the remaining distance and sends the created data to the printer 200 (Step S34). This remaining distance is [N−(N1−X)−n1], where n1 is the width of the pattern of the marker.

After the white data and print data of the upper marker MK1 of an amount corresponding to the width N of the tear-off sprocket-hole section BB1 have been sent to the printer 200 (Yes at Step S33), the print-data output unit 8 reads the print image data from the line buffer 7 and sends the print image data of an amount corresponding to the sheet width set in the sheet-width setting register 10 to the printer 200 (Step S35). As a result, one line worth of the print image data and the upper marker MK1 is recorded on the first page of the continuous printing paper PP.

After one line of the print image data is sent to the printer 200, the sheet-length counter 17 is counted up. The sending of the pattern of the upper marker MK1 is repeated in the same manner until the sheet-length counter 17 indicates the number of lines corresponding to the upper marker length M2 (No at Step S36). Consequently, both the print image data and the upper marker MK1 are recorded on the first page of the continuous printing paper PP.

After that, until the sheet-length counter 17 indicates a value that is one less than a value corresponding to a position displaced by (M1−(M2+Y)) from the print start position of the lower marker MK2 in the sub-scanning direction, i.e., the position SS, which is the page upper end position of the displaced image printing area GA (SS2 in FIG. 9) (No at Step S38), as the operation for a line without a marker, the sending of the white data of the amount corresponding to the width N of the tear-off sprocket-hole section BB1 to the printer 200, and the sending of the print image data read from the line buffer 7 of the amount corresponding to the sheet width set in the sheet-width setting register 10 (Step S37) to the printer 200 are repeated similarly.

When the sheet-length counter 17 indicates the value corresponding to the position displaced by (M1−(M2+Y)) (Yes at Step S38), the process proceeds to the operation for forming the lower marker MK2.

More particularly, the data-printed-on-tear-off-sprocket-hole-section creating unit 20 creates white data of an amount corresponding to a distance up to a position immediately before the forming start position of the lower marker MK2 in the main-scanning direction and sends the created data to the printer 200 byte by byte. In this example, if a two-line mark is formed, regardless of the value of X, at a position at a distance N2 from the side of the sheet, as understood from FIG. 9, the lower marker MK2 is formed at the position in the main-scanning direction at the distance (N2−X) from the position SS, i.e., the page upper end position of the displaced image printing area GA (SS2 in FIG. 9), and thus the data-printed-on-tear-off-sprocket-hole-section creating unit 20 creates white data of an amount corresponding to the distance (N2−X) and sends the created data to the printer 200 byte by byte (Step S39).

Every time one byte of the white data is sent to the printer 200, the sheet-width counter 16 is counted up. After sending the white data of the amount corresponding to (N2−X) to the printer 200, the data-printed-on-tear-off-sprocket-hole-section creating unit 20 creates data of the pattern of the marker set in the lower-marker selecting register 15 as the print data of the lower marker MK2 and sends the created data to the printer 200 (Step S40). After that, if the sum of the width of the white data and the width of the lower marker is less than the width N of the tear-off sprocket-hole section BB1 (No at Step S41), the data-printed-on-tear-off-sprocket-hole-section creating unit 20 creates white data of an amount corresponding to the remaining distance and sends the created data to the printer 200 (Step S42). This remaining distance is [N−(N2−X)−n2], where n2 is the width of the pattern of the marker.

After the white data and print data of the lower marker MK2 of the amount corresponding to the width N of the tear-off sprocket-hole section BB1 are sent to the printer 200 (Yes at Step S41), in the same manner as described above, the print-data output unit 8 reads the print image data from the line buffer 7 and sends the print image data of the amount corresponding to the sheet width set in the sheet-width setting register 10 to the printer 200 (Step S43). As a result, one line worth of the print image data and the lower marker MK2 is recorded on the first page of the continuous printing paper PP.

After one line of the print image data is sent to the printer 200, the sheet-length counter 17 is counted up. The sending of the pattern of the lower marker MK2 is repeated in the same manner until the sheet-length counter 17 indicates the number of lines corresponding to M1 indicating the trailing end of page (No at Step S44). Consequently, both the print image data and the lower marker MK2 are recorded on the first page of the continuous printing paper PP.

After that, the print-data output unit 8 resets the sheet-length counter 17 and regards data, which are set in the upper-marker selecting register 14 and the lower-marker selecting register 15 and which specify the markers to be formed on the next page, to be valid, and in response to a print-image-data request signal received from the printer 200 for the image of the next page, in the same manner as for the first page, with respect to the second page, sends the white data and print data of the marker of the amount corresponding to the width N of the tear-off sprocket-hole section BB1 and the print image data read from the line buffer 7 to the printer 200.

If the length of the upper marker MK1 is 0, it is unnecessary to perform the operation for forming the upper marker MK1, and the above-described operation for a line without a marker is performed until the sheet-length counter 17 indicates the number of lines corresponding to the print start position of the lower marker MK2 in the sub-scanning direction.

If the lower marker MK2 is not formed to reach the trailing end of the page in the sub-scanning direction, after the sheet-length counter 17 indicates a value corresponding to the end position of the lower marker MK2 in the sub-scanning direction (calculated from the print start position and the length) and until the sheet-length counter 17 indicates the number of lines corresponding to M1 indicating the trailing end of the page, the above-described operation for a line without a marker is performed.

As described above, according to the present embodiment, by forming the print image data and the marker using the same image-data creating process, even when the print image data is displaced in both the main-scanning direction and the sub-scanning direction, with the easier process, a marker selected from a plurality of patterns is printable in a tear-off sprocket-hole section across a perforated line (boundary between pages) and the marker is preventable from overlapping any sprocket holes.

Although the present embodiment has been described, the configuration of the device, the specific contents of the processes, the forms of the paper sheet, and the forms of the markers are not limited to those described above.

For example, in the above embodiment, although the operator performs the operation to displace the image printing area GA (print image data) in the positive or negative directions for both the sub-scanning direction and the main-scanning direction, the present invention is also applicable when the operator performs an operation to displace the printing area in the negative direction of the sub-scanning direction and in the positive direction of the main-scanning direction or when the operator performs an operation to displace the printing area in the positive direction of the sub-scanning direction and in the negative direction of the main-scanning direction.

The positional adjustment corresponding to the displacement in the sub-scanning direction (based on calculation of the length and the print start position in the sub-scanning direction of the marker) and the positional adjustment corresponding to the displacement in the main-scanning direction (based on the calculation of the sent amount of the white data in the tear-off sprocket-hole section BB1 upon the sending of the print image data) are each independently applicable.

Such operations to displace the image printing area GA (print image data) may be done manually by the operator, but may also be done, for example, automatically by software like a printer driver. In the latter case, the image printing area is displaced by the functions of the printer driver in accordance with the contents of the operations for displacing the print image data, which are input by a user on a printer-driver setting screen.

In the above embodiment, although the continuous printing paper PP is separatable into pages by the perforated lines BL, the present invention is similarly applicable to a case in which separation means equivalent to the perforated lines BL are provided. Moreover, the present invention may also be applicable to continuous printing paper provided with mere boundary lines between printing areas instead of such separation means.

In the above embodiment, although the sections provided with the sprocket holes (the tear-off sprocket-hole sections BB1 and BB2) are separable, the present invention is similarly applicable to continuous printing paper with inseparable sections provided with sprocket holes.

Although not specified in the above embodiment, naturally, a certain clearance between a marker and a sprocket hole may be ensured when setting the length and the print start position in the sub-scanning direction of each marker.

Various patterns may be used as the markers, such as a pattern painted solidly or a crossline pattern. The lengths of the upper marker MK1 and lower marker MK2 for the case in which the image printing area GA is not displaced are not necessarily equal to each other.

The printer control device 100 according to the present invention may be implemented by a computer program (software) as device driver means for controlling the printer 200 and is applicable to an information processing apparatus including a device driver unit that controls devices other than the printer 200. For example, the present invention is applicable to a device driver unit for controlling various image forming apparatuses, such as a scanner, a facsimile machine, and a copying machine, and an information processing apparatus including this device driver unit.

Such a computer program may be stored beforehand in storage means provided in a computer, such as a ROM, an HDD, or an SSD. Alternatively, the computer program may be stored: in a recording medium such as a CD-ROM, a flexible disk, an MO, a CD-R, a CD-RW, a DVD+R, a DVD+RW, a DVD-R, or a DVD-RW; or in a nonvolatile recording medium (memory) such as a DVD-RAM, SRAM, a NOV-RAM, an EEPROM, or a memory card. The above processes are executable by installing the computer program recorded in the memory and causing the CPU to execute it or by causing the CPU to read the computer program from the memory and execute it.

The computer program may be downloaded from an external device including a recording medium that has the computer program recorded therein, or an external device with storage means in which the computer program has been stored, which is connected to a network, and executed.

In the present embodiment, the example in which the image-formation control device according to the present invention is applied to the printer control device that controls the printer 200, which is the image forming apparatus, has been explained, but the present invention is not limited thereto. For example, the image-formation control device according to the present invention is applicable to a control device that controls an image forming apparatus, which is an MFP having a printer function together with at least one of a copy function, a scan function, and a facsimile function.

Moreover, the configurations and the modifications of each embodiment above may be combined in any way as appropriate so long as there are no contradictions.

As it is clear from the above description, by applying the present invention, an image-formation control device and an image forming apparatus are providable, by which a marker is printable across a page boundary of continuous printing paper PP with easy control and the marker is prevented from overlapping a sprocket hole, even if an image printing area is displaced According to one aspect of the present invention, even if an image printing area is displaced, without having to provide a mechanism dedicated to recognition of a page boundary position of continuous recording paper, an upper marker and an lower marker are printable across a page boundary position by simple control, and the upper marker and the lower marker are prevented from overlapping holes.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-formation control device configured to control an image forming apparatus configured to perform image formation on a continuous form that has side portions provided with holes and that has a page boundary per predetermined length, the image-formation control device comprising:

an input receiving unit configured to receive an input of a displacement of an image forming area in a sub-scanning direction from a reference position on the continuous form, the image forming area being a target of the image formation;

a marker-length calculating unit configured to calculate marker lengths of an upper marker marking an upper end of a page of the continuous form and a lower marker marking a lower end of a page of the continuous form, based on the displacement, a shortest distance to the holes from the page boundary in the side portions, and a reference marker length for when the displacement is not specified with respect to each of the upper marker and the lower marker;

a marker-start-position calculating unit configured to calculate image-formation start positions of the upper marker and the lower marker based on the displacement, the distance, the reference marker length, and a length of the image forming area in the sub-scanning direction; and a control unit configured to perform, with respect to the image forming apparatus, control of the image formation of the upper marker and the lower marker in the side portions from the image-formation start positions calculated over the marker lengths calculated.

2. The image-formation control device according to claim 1, wherein if the displacement is Y, the distance is L, the reference marker length is M2, the length of the image forming area is M1, and $Y<0$, the marker-length calculating unit calculates the length of the upper marker to be (L+M2) if $Y \le -L$, and the marker-start-position calculating unit calculates the image-formation start position of the upper marker to be a position displaced by [−(L+Y)] from a page upper end of the image forming area that has been displaced by the displacement in the sub-scanning direction, if $Y \le -L$.

3. The image-formation control device according to claim 2, wherein the marker-length calculating unit calculates the length of the upper marker to be (M2−Y) if $Y > -L$, and the marker-start-position calculating unit calculates the image-formation start position of the upper marker to be a position of the page upper end of the image forming area that has been displaced by the displacement in the sub-scanning direction, if $Y > -L$.

4. The image-formation control device according to claim 1, wherein if the displacement is Y, the distance is L, the reference marker length is M2, the length of the image forming area is M1, and $Y<0$, the marker-length calculating unit calculates the length of the lower marker to be M2 if $-(L-M2)<Y \le 0$, and the marker-start-position calculating unit calculates the image-formation start position of the lower marker to be a position displaced by (M1−M2) from a page upper end of the image forming area that has been displaced by the displacement in the sub-scanning direction, if $-(L-M2)<Y \le 0$.

5. The image-formation control device according to claim 4, wherein the marker-length calculating unit calculates the length of the lower marker to be (Y+L), if $-L<Y \le [-(L-M2)]$, and the marker-start-position calculating unit calculates the image-formation start position of the lower marker to be a position displaced by [M1−(L+Y)] from the page upper end of the image forming area that has been displaced by the displacement in the sub-scanning direction, if $-L<Y \le [-(L-M2)]$.

6. The image-formation control device according to claim 5, wherein the marker-length calculating unit calculates the length of the lower marker to be 0 if $Y \le -L$, and the marker-start-position calculating unit calculates the image-formation start position of the lower marker to be a position displaced by M1 from the page upper end of the image forming area that has been displaced by the displacement in the sub-scanning direction, if $Y \le -L$.

7. The image-formation control device according to claim 1, wherein if the displacement is Y, the distance is L, the reference marker length is M2, the length of the image forming area is M1, and $Y>0$, the marker-length calculating unit calculates the length of the upper marker to be M2 if $Y \le (L-M2)$, and the marker-start-position calculating unit calculates the image-formation start position of the upper marker to be a page upper end of the image forming area that has been displaced by the displacement in the sub-scanning direction, if $Y \le (L-M2)$.

8. The image-formation control device according to claim 7, wherein, if $(L-M2)<Y<L$, the marker-length calculating unit calculates the length of the upper marker to be (L−Y).

9. The image-formation control device according to claim 8, wherein, if L≤Y, the marker-length calculating unit calculates the length of the upper marker to be 0.

10. The image-formation control device according to claim 1, wherein if the displacement is Y, the distance is L, the reference marker length is M2, the length of the image forming area is M1, and Y>0, the marker-length calculating unit calculates the length of the lower marker to be (M2+Y) if Y<L, the marker-length calculating unit calculates the length of the lower marker to be (M2+L) if L≤Y, and the marker-start-position calculating unit calculates the image-formation start position of the lower marker to be a position displaced by [M1−(M2+Y)] from a page upper end of the image forming area that has been displaced by the displacement in the sub-scanning direction.

11. The image-formation control device according to claim 1, further comprising a selecting unit configured to select patterns of the upper marker and the lower marker based on an instruction from a host device connected to via a network, wherein the control unit is further configured to perform, with respect to the image forming apparatus, control of the image formation of the upper marker and the lower marker of the patterns selected.

12. An image-formation control method executed by an image-formation control device configured to control an image forming apparatus configured to perform image formation on a continuous form that has side portions provided with holes and a page boundary per predetermined length, the image-formation control method comprising:

receiving an input of a displacement of an image forming area in a sub-scanning direction from a reference position on the continuous form, the image forming area being a target of the image formation;

calculating marker lengths of an upper marker marking an upper end of a page of the continuous form and a lower marker marking a lower end of a page of the continuous form, based on the displacement, a shortest distance to the holes from the page boundary in the side portions, and a reference marker length for when the displacement is not specified with respect to each of the upper marker and the lower marker;

calculating image-formation start positions of the upper marker and the lower marker based on the displacement, the distance, the reference marker length, and a length of the image forming area in the sub-scanning direction; and performing, with respect to the image forming apparatus, control of the image formation of the upper marker and the lower marker in the side portions from the image-formation start positions calculated over the marker lengths calculated.

13. A computer program product comprising a non-transitory computer-usable medium having computer-readable program codes embodied in the medium for controlling an image forming apparatus configured to perform image formation on a continuous form that has end portions provided with holes and that has a page boundary per predetermined length, the program codes when executed causing a computer to execute:

receiving an input of a displacement of an image forming area in a sub-scanning direction from a reference position on the continuous form, the image forming area being a target of the image formation;

calculating marker lengths of an upper marker marking an upper end of a page of the continuous form and a lower marker marking a lower end of a page of the continuous form, based on the displacement, a shortest distance to the holes from the page boundary in the side portions, and a reference marker length for when the displacement is not specified with respect to each of the upper marker and the lower marker;

calculating image-formation start positions of the upper marker and the lower marker based on the displacement, the distance, the reference marker length, and a length of the image forming area in the sub-scanning direction; and performing, with respect to the image forming apparatus, control of the image formation of the upper marker and the lower marker in the side portions from the image-formation start positions calculated over the marker lengths calculated.

* * * * *